US012609601B2

(12) United States Patent
Shuai et al.

(10) Patent No.: US 12,609,601 B2
(45) Date of Patent: Apr. 21, 2026

(54) SOLID-STATE TRANSFORMER, POWER SUPPLY DEVICE, AND DATA CENTER

(71) Applicant: Huawei Digital Power Technologies Co., Ltd., Shenzhen (CN)

(72) Inventors: Peng Shuai, Shenzhen (CN); Zhuyong Huang, Dongguan (CN); Xiaofei Zhang, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 343 days.

(21) Appl. No.: 18/451,914

(22) Filed: Aug. 18, 2023

(65) Prior Publication Data

US 2023/0396145 A1      Dec. 7, 2023

Related U.S. Application Data

(63) Continuation of application No. PCT/CN2021/079276, filed on Mar. 5, 2021.

(51) Int. Cl.
*H02M 5/12* (2006.01)
*H02M 1/00* (2006.01)

(52) U.S. Cl.
CPC ........... *H02M 1/0074* (2021.05); *H02M 5/12* (2013.01)

(58) Field of Classification Search
CPC .............................. H02M 1/0074; H02M 5/12
See application file for complete search history.

(56) References Cited

U.S. PATENT DOCUMENTS 11,683,900 B2 * 6/2023 Lan ....................... H01F 27/085
361/695
2012/0020463 A1 1/2012 Cooley et al.
(Continued)

FOREIGN PATENT DOCUMENTS

CN 109861557 A 6/2019
CN 111491483 A 8/2020
(Continued)

OTHER PUBLICATIONS

Cottet et al., "Integration Technologies for a Fully Modular and Hot-Swappable MV Multi-Level Concept Converter", VDE Verlag GMBH, PCIM Europe 2015, May 19-21, 2015, ISBN: 978-8007-3924-0, 8 pages.
(Continued)

*Primary Examiner* — Adolf D Berhane
(74) *Attorney, Agent, or Firm* — Maier & Maier, PLLC

(57) ABSTRACT
A solid-state transformer, a power supply device, and a data center, related to the field of power technologies, to resolve problems of low power density and high manufacturing costs of the solid-state transformer. The solid-state transformer includes a housing and M power conversion units. The M power conversion units include a first power conversion circuit, a high-frequency transformer, and a second power conversion circuit, and the first power conversion circuit is coupled to the second power conversion circuit by using the high-frequency transformer. The housing has an insulation base and a conductive enclosure, the conductive enclosure is sleeved on an outer surface of the insulation base. The insulation base has an accommodating cavity, and in the M power conversion units, at least first power conversion circuits are disposed in the accommodating cavity at intervals, where M is an integer greater than 1.

17 Claims, 12 Drawing Sheets

(56) References Cited

U.S. PATENT DOCUMENTS

| | | | |
|---|---|---|---|
| 2017/0064853 A1 | 3/2017 | Izrailit | |
| 2023/0368970 A1* | 11/2023 | Shuai | H01F 27/32 |
| 2024/0014740 A1* | 1/2024 | Li | H02M 3/155 |
| 2025/0070673 A1* | 2/2025 | Xia | H02M 1/0038 |

FOREIGN PATENT DOCUMENTS

| | | |
|---|---|---|
| CN | 212381098 U | 1/2021 |
| DE | 4243695 A1 | 7/1994 |
| DE | 10004806 A1 | 8/2000 |
| DE | 102018133007 A1 | 6/2020 |
| EP | 3696931 A1 | 8/2020 |
| EP | 3771068 A1 | 1/2021 |
| GB | 882561 A | 11/1961 |
| KR | 1020170034956 A | 3/2017 |

OTHER PUBLICATIONS

Zhu et al., "High-Efficiency, Medium Voltage-Input, Solid-State Transformer-Based 400-kW/1000-V/400-A Extreme Fast Charger for Electric Vehicles", Delta, DE-EE0008361, ELT241, Jun. 13, 2019, 26 pages.

\* cited by examiner

11

111      112      113

11

111    112    113

SOLID-STATE TRANSFORMER, POWER SUPPLY DEVICE, AND DATA CENTER

CROSS-REFERENCE TO RELATED APPLICATIONS

This application is a continuation of International Application No. PCT/CN2021/079276, filed on Mar. 5, 2021, the disclosure of which is hereby incorporated by reference in its entirety.

TECHNICAL FIELD

The embodiments relate to the field of power technologies, a solid-state transformer, a power supply device, and a data center.

BACKGROUND

A solid-state transformer is also referred to as a power electronic transformer. In the solid-state transformer, a high-frequency electric energy conversion technology based on an electromagnetic induction principle is combined with a power electronic conversion technology, to convert electric energy with one power feature into electric energy with another power feature. The solid-state transformer may include a plurality of power conversion units. Each of the power conversion units may include a power conversion circuit on a high-voltage side, a high-frequency transformer, and a power conversion circuit on a low-voltage side. To meet a safety regulation requirement and an insulation requirement, in each of the power conversion units, the power conversion circuit on the high-voltage side and the power conversion circuit on the low-voltage side each need to meet a basic insulation requirement for a protection ground, and a requirement on insulation between the power conversion units also needs to be met. However, in a current solid-state transformer, insulation materials and space may be wasted, thereby neither facilitating increasing power density of the solid-state transformer nor facilitating reducing manufacturing costs.

SUMMARY

The embodiments may provide a solid-state transformer, a power supply device, and a data center that can meet a safety regulation requirement and an insulation requirement and facilitate increasing power density and effectively reducing manufacturing costs.

According to one aspect, the embodiments may provide a solid-state transformer, including a housing and M power conversion units. The power conversion unit includes a first power conversion circuit, a high-frequency transformer, and a second power conversion circuit, and the first power conversion circuit is coupled to the second power conversion circuit by using the high-frequency transformer. The housing has an insulation base and a conductive enclosure, and the conductive enclosure is sleeved on an outer surface of the insulation base. The insulation base has an accommodating cavity. In the M power conversion units, at least first power conversion circuits are disposed in the accommodating cavity at intervals, where M is an integer greater than 1. The insulation base is configured to ensure insulation performance of the housing, and the conductive enclosure is sleeved on the outer surface of the insulation base and is grounded, to meet a safety regulation requirement of the solid-state transformer. The insulation base has the accommodating cavity, and a plurality of power conversion units are disposed in the accommodating cavity. That is, a requirement on insulation between the plurality of power conversion units and the outside world may be met by using the housing. In addition, the plurality of power conversion units may be disposed in the accommodating cavity at intervals. Therefore, a requirement on insulation between different power conversion units may be met by using plenty of clearances. In the solid-state transformer provided in this embodiment, a safety regulation requirement and an insulation requirement of the plurality of power conversion units can be met by using one housing, thereby facilitating reducing a quantity of used insulation materials, and facilitating reducing manufacturing costs. In addition, because a volume of the housing may be effectively reduced, power density of the solid-state transformer may be increased.

In an implementation, the housing may have various structures.

For example, the outer surface of the insulation base may hermetically fit an inner wall of the conductive enclosure. Occurrence of an air gap between the insulation base and the conductive enclosure may be prevented through hermetic fitting, thereby ensuring insulation performance of the housing and preventing occurrence of undesirable phenomena, such as an air breakdown and a partial discharge.

In addition, to prevent occurrence of a phenomenon between the insulation base and the conductive enclosure, for example, an air breakdown, alternatively, the insulation base may be electrically connected to the conductive enclosure.

For example, a first conducting layer may be disposed for the insulation base. After the conductive enclosure is sleeved on a periphery of the insulation base, the first conducting layer may be electrically connected to the conductive enclosure. When there is an air gap between the insulation base and the conductive enclosure, because the first conducting layer is electrically connected to the conductive enclosure, no voltage difference exists in the air gap, so that occurrence of undesirable phenomena such as an air breakdown and a partial discharge can be effectively prevented.

In an implementation, the first conducting layer may be disposed on the outer surface of the insulation base or built inside the insulation base.

In addition, to prevent occurrence of a phenomenon inside the accommodating cavity, for example, an air breakdown, a second conducting layer may also be disposed for the insulation base. A potential point (for example, the midpoint of a negative bus or the midpoint of a positive and negative bus) in the power conversion unit may be electrically connected to the second conducting layer.

A quantity of disposed second conducting layers may be the same as a quantity of the disposed power conversion units, and the second conducting layers are disposed in a one-to-one correspondence with the power conversion units. In an implementation, the second conducting layer may be disposed on the outer surface of the insulation base or built inside the insulation base.

In an implementation, considering that an insulation voltage to ground of the first power conversion circuit is higher than an insulation voltage to ground of the second power conversion circuit, in each of the power conversion units, a potential point in the first power conversion circuit may be electrically connected to the second conducting layer.

In some cases, the first power conversion circuit may be insulated with a high specification and the second power conversion circuit may be insulated with a low specification. Therefore, the first power conversion circuit may be disposed in the housing, and the second power conversion circuit may be disposed outside the housing, to reduce the volume of the housing, thereby helping increase power density of the solid-state transformer.

In an implementation, at least the first power conversion circuits in the plurality of power conversion units may be disposed in the housing, to meet an insulation requirement and the safety regulation requirement of the solid-state transformer.

In addition, in some implementations, the housing may further include an insulation separator. Every two adjacent first power conversion circuits may be isolated by the insulation separator. Insulation performance of the insulation separator is superior to insulation performance of air. Therefore, disposing the insulation separator between the two adjacent first power conversion circuits may also effectively reduce a distance between the two adjacent first power conversion circuits, to increase power density of the solid-state transformer. In addition, when the insulation separator is provided in the accommodating cavity, the second conducting layer may also extend to the insulation separator.

In an application, the solid-state transformer may further include an input circuit unit. The power conversion unit may be connected to a power grid by using the input circuit unit.

The input circuit unit may include: a filter circuit, a soft-start circuit, a protection circuit, and the like. Electric energy in the power grid may be preliminarily processed by the input circuit unit, and is then transferred to the power conversion unit, to ensure quality of the electric energy, thereby enhancing security of the power conversion unit and the like. It can be understood that, in an implementation, types and a quantity of input circuit units are not limited.

According to another aspect, the embodiments may further provide a power supply device, including a cabinet and the solid-state transformer in any one of the foregoing implementations. The solid-state transformer is disposed in the cabinet, and a conductive enclosure is grounded by using the cabinet. In an application, the power supply device may be a charging pile of a new energy vehicle, or the like. A type of the power supply device is not limited.

In addition, the embodiments may further provide a data center, including a plurality of load devices and a solid-state transformer. The data center may include an equipment room and the load devices such as a server and a memory that are located in the equipment room. The load device may be connected to a power grid by using the solid-state transformer, to receive electric energy in the power grid.

DETAILED DESCRIPTION OF THE EMBODIMENTS

To make objectives, solutions, and advantages clearer, the following further describes the embodiments in detail with reference to the accompanying drawings.

To facilitate understanding of a solid-state transformer provided in an embodiment, an application scenario of the solid-state transformer is first described below.

The solid-state transformer may serve as an intermediate device between a power grid and a load device, to convert a voltage in the power grid for use by the load device. The solid-state transformer may connect a medium-voltage power grid and a low-voltage load. For example, a data center may include a plurality of load devices (for example, a server). The medium-voltage power grid may supply a medium-voltage (for example, 10 kV) alternating current to an equipment room. However, the load device in the data center may require a low-voltage (for example, 220 V or 400 V) direct current or alternating current. Therefore, the solid-state transformer may process a voltage of the medium-voltage power grid, to convert the voltage to a voltage with a value and a type that are required by the load device. Alternatively, in some other application scenarios, the solid-state transformer can convert electric energy generated on a low-voltage side and then transfer converted electric energy to the medium-voltage power grid. For example, the solid-state transformer may connect the medium-voltage power grid and a photovoltaic station. The solid-state transformer may process, for example, step up, electric energy generated by the photovoltaic station, and then transfer converted electric energy to the medium-voltage power grid.

Figure 1:
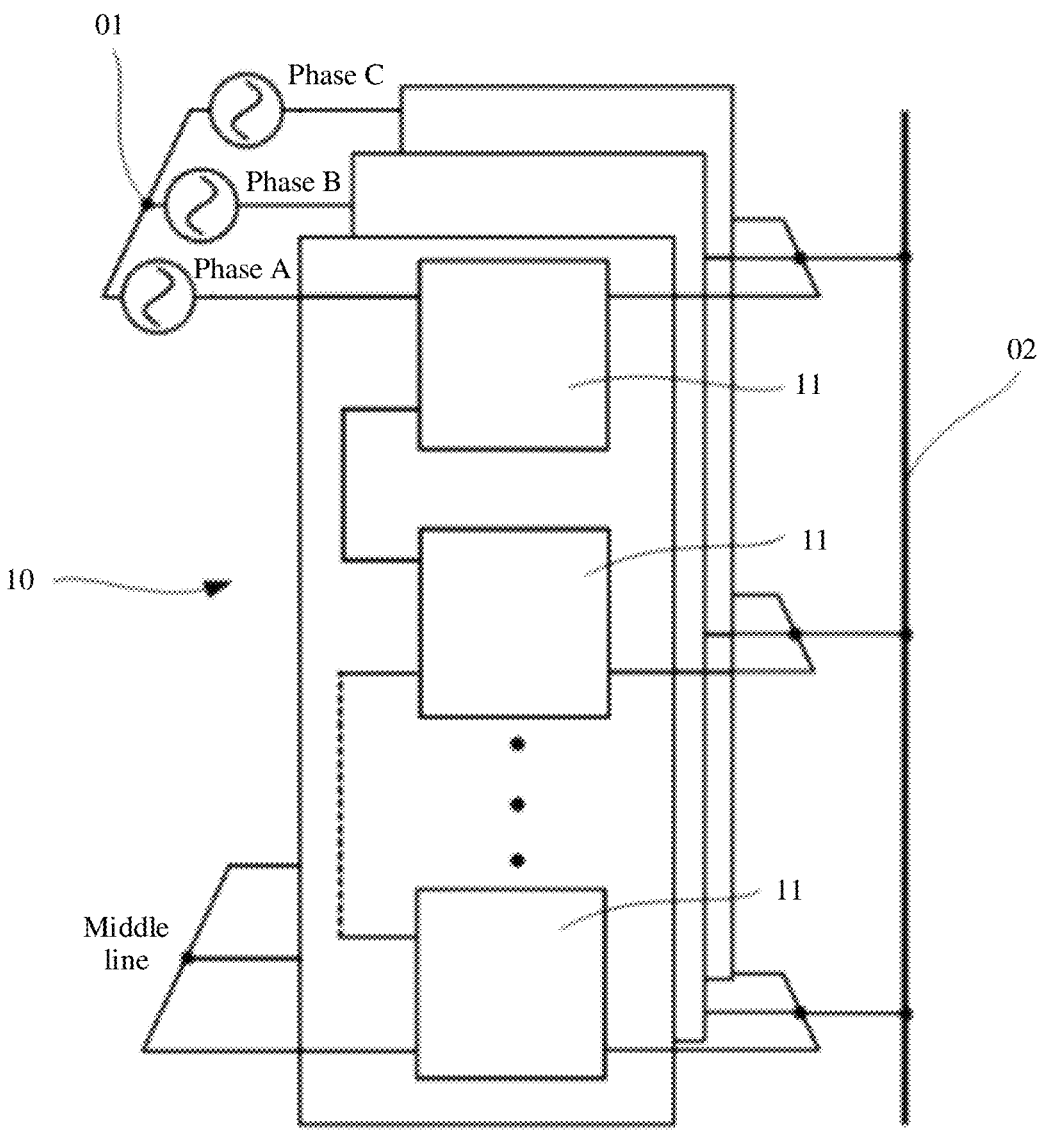
FIG. 1 is a schematic diagram of an application scenario of a solid-state transformer according to an embodiment.

As shown in FIG. 1, a power grid 01 may supply a three-phase alternating current. The three-phase alternating current may include a phase A, a phase B, and a phase C. Each phase may be connected to a power conversion unit 11 in a solid-state transformer 10. A plurality of power conversion units 11 may process, for example, step down and convert, power supplied by the power grid 01, to output a low-voltage alternating current or direct current for use by a load terminal 02.

Figure 2:
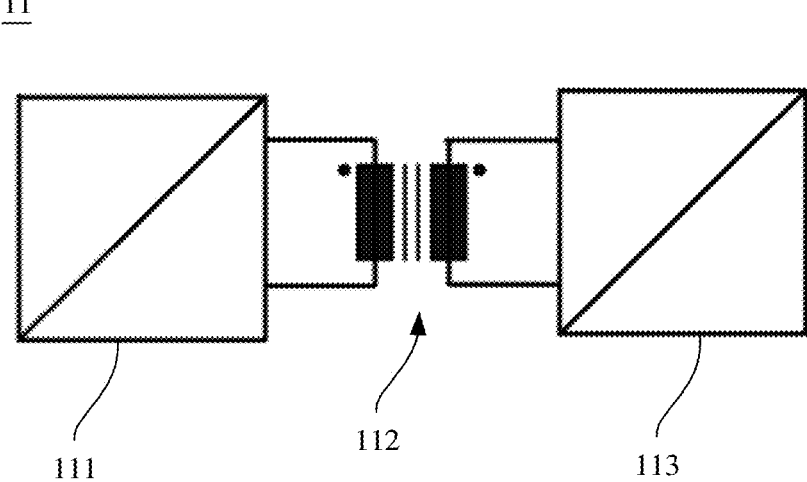
FIG. 2 is a schematic diagram of a structure of a power conversion unit according to an embodiment.

As shown in FIG. 2, each of the power conversion units 11 may include a first power conversion circuit 111 (a power conversion circuit on a medium-voltage side), a high-frequency transformer 112, and a second power conversion circuit 113 (a power conversion circuit on a low-voltage side). The first power conversion circuit 111 may be coupled to the second power conversion circuit 113 by using the high-frequency transformer 112. The first power conversion circuit 111 is connected to the power grid 01, and the second power conversion circuit 113 is connected to the load terminal 02. It should be noted that a medium voltage and a low voltage represent only two relative concepts, rather than limiting values of the voltages. In other words, a voltage of the power conversion circuit on the medium-voltage side is greater than a voltage of the power conversion circuit on the low-voltage side.

In actual application, to meet a safety regulation requirement and an insulation requirement, each of the power conversion units 11 is equipped with an independent housing, to insulate each of the power conversion units 11. However, such a structural setting significantly increases a quantity of used insulation materials, thereby increasing manufacturing costs. In addition, the housing takes up a large quantity of space. After each of the power conversion units 11 is equipped with the independent housing, an increase in power density of the solid-state transformer 10 is not facilitated.

To this end, an embodiment may provide a solid-state transformer that can effectively reduce a quantity of used insulation materials and help increase power density.

To clearly understand the solid-state transformer, descriptions are provided below with reference to the accompanying drawings and the embodiments.

Terms used in the following embodiments are merely intended to describe particular embodiments, but are not intended as limiting. The terms "one", "a", "the foregoing" "the", and "the one" of singular forms used are also intended to include expressions such as "one or more", unless otherwise specified in the context clearly. It should be further understood that in the following embodiments, "at least one" and "one or more" mean one, two, or more. Term "and/or" describes an association relationship between associated objects and represents that three relationships may exist. For example, A and/or B may represent the following cases: only A exists, both A and B exist, and only B exists, where A and B may be singular or plural. The character "/" may indicate an "or" relationship between associated objects.

Reference to "one embodiment", "some embodiments", or the like means that a particular feature, structure, or characteristic described with reference to one or more embodiments is included in the one or more embodiments. Therefore, statements such as "in an embodiment", "in some embodiments", "in some other embodiments", and "in other embodiments" that appear at different places do not necessarily mean referring to a same embodiment. Instead, the statements mean "one or more but not all of embodiments", unless otherwise emphasized in another manner. The terms "include", "contain", "have", and their variants all mean "include but are not limited to", unless otherwise emphasized in another manner.

Figure 3:
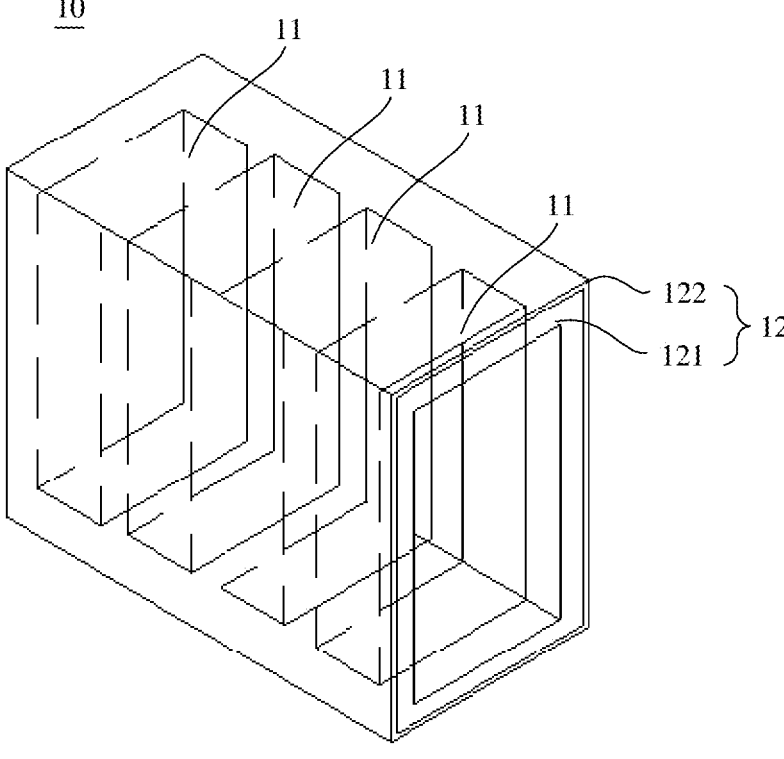
FIG. 3 is a schematic diagram of a structure of a solid-state transformer according to an embodiment.

As shown in FIG. 3, in one embodiment, a solid-state transformer 10 includes a housing 12 and a plurality of power conversion units 11 (four power conversion units are shown in the figure). The power conversion unit 11 is configured to convert and adjust electric energy. The housing 12 is configured to accommodate the power conversion unit 11, to meet a safety regulation requirement and an insulation requirement of the solid-state transformer 10.

Figure 4:
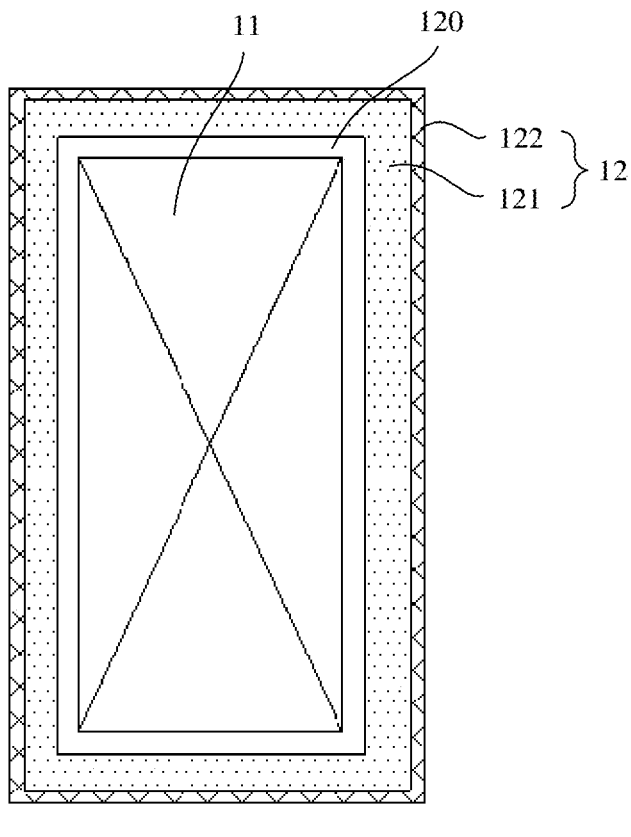
FIG. 4 is a cross sectional schematic view of a solid-state transformer according to an embodiment.

As shown in FIG. 4, the housing 12 has an insulation base 121 and a conductive enclosure 122. The insulation base 121 is configured to ensure insulation performance of the housing 12, and the conductive enclosure 122 is sleeved on an outer surface of the insulation base 121 and is grounded, to meet the safety regulation requirement of the solid-state transformer 10. The insulation base 121 has an accommodating cavity 120, and the plurality of power conversion units 11 are disposed in the accommodating cavity 120. That is, a requirement on insulation between the plurality of power conversion units 11 and the outside world may be met by using the housing 12. In addition, the plurality of power conversion units 11 are disposed in the accommodating cavity 120 at intervals. Therefore, a requirement on insulation between different power conversion units 11 may be met by using plenty of clearance. In the solid-state transformer 10 provided in this embodiment, a safety regulation requirement and the insulation requirement of the plurality of power conversion units 11 can be met by using one housing 12, thereby facilitating reducing a quantity of used insulation materials, and facilitating reducing manufacturing costs. In addition, because a volume of the housing 12 may be effectively reduced, power density of the solid-state transformer 10 may be increased.

In addition, an electrical connection is also required between the plurality of power conversion units 11. Therefore, an additional cable may be used for connection. In the solid-state transformer 10 provided in this embodiment, because the plurality of power conversion units 11 may be located in one housing 12, the cable for connecting different power conversion units 11 may also be disposed in the housing 12. The cable needs to ensure only a requirement on insulation against the power conversion unit 11. Therefore, the insulation requirement and a safety regulation requirement of the cable are low, thereby facilitating reducing use costs of the cable. Alternatively, it can be understood that, if each of the power conversion units 11 is accommodated in an independent housing 12, the cable for connecting different power conversion units 11 is exposed outside the housing 12. Therefore, a high insulation requirement and a high safety regulation requirement need to be met. Consequently, use costs of the cable are increased.

In an implementation, a quantity of power conversion units 11 included in the solid-state transformer 10 may be two or more. Alternatively, the solid-state transformer may include M power conversion units 11, and M is an integer greater than 1. The quantity of power conversion units 11 is not limited.

In an implementation, the housing 12 may have various structures.

For example, as shown in FIG. 4, in one embodiment, the outer surface of the insulation base 121 may hermetically fit an inner wall of the conductive enclosure 122. Occurrence of an air gap between the insulation base 121 and the conductive enclosure 122 may be prevented through hermetic fitting, thereby ensuring insulation performance of the housing 12 and preventing occurrence of undesirable phenomena, such as an air breakdown and a partial discharge.

As shown in FIG. 3, in embodiment, the insulation base 121 is a cylindrical structure with a rectangular cross section, and the outer surface of the insulation base 121 refers to four outer side surfaces of the insulation base 121. The conductive enclosure 122 is a cylindrical structure with a rectangular cross section, and four inner side walls of the conductive enclosure 122 hermetically fit the four outer side surfaces of the insulation base 121, respectively. It can be understood that, in another implementation, the insulation base 121 and the conductive enclosure 122 each may have another shape and structure. This is not limited.

During manufacturing, the conductive enclosure 122 may be first manufactured and formed, and then the insulation base 121 may be directly formed on the inner wall of the conductive enclosure 122 by using a process, for example, in-mold decoration, to implement manufacturing of the insulation base 121. In addition, hermetic fitting between the insulation base 121 and the conductive enclosure 122 can be further effectively enhanced, and occurrence of an undesirable phenomenon is prevented, for example, an air gap. The conductive enclosure 122 may be manufactured by using a material with good conductivity, for example, an aluminum alloy, or may be manufactured by using another type of material with conductivity. The insulation base 121 may be manufactured by using a material with good insulation performance, for example, resin and nylon. Materials of the conductive enclosure 122 and the insulation base 121 are not limited.

In addition, to prevent occurrence of a phenomenon between the insulation base 121 and the conductive enclosure 122, for example, an air breakdown, alternatively, the insulation base 121 may be electrically connected to the conductive enclosure 122.

Figure 5:
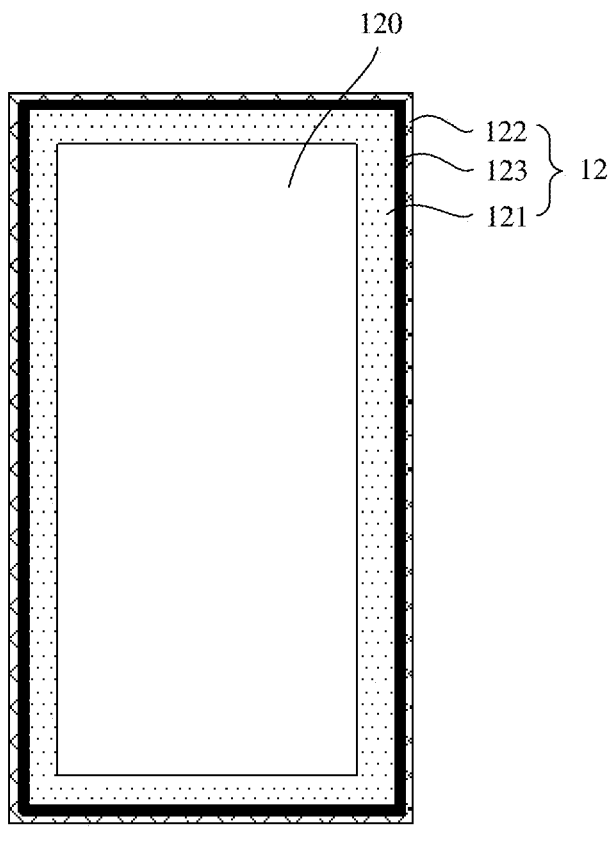
FIG. 5 is a cross sectional schematic view of a housing according to an embodiment.

For example, as shown in FIG. 5, in one embodiment, a first conducting layer 123 is disposed on the outer surface of the insulation base 121. After the conductive enclosure 122 is sleeved on a periphery of the insulation base 121, the first conducting layer 123 may be electrically connected to the conductive enclosure 122. When there is an air gap between the insulation base 121 and the conductive enclosure 122, because the first conducting layer 123 is electrically connected to the conductive enclosure 122, no voltage difference exists in the air gap, so that occurrence of undesirable phenomena such as an air breakdown and a partial discharge can be effectively prevented.

During disposing, the first conducting layer 123 may be directly formed on the outer surface of the insulation base 121 by using a process, for example, coating or vapor deposition, to effectively prevent occurrence of an air gap between the first conducting layer 123 and the insulation base.

It can be understood that, in another implementation, the conductive enclosure 122 may be alternatively omitted. That is, the first conducting layer 123 may be directly grounded to replace a function of the conductive enclosure 122. Both the first conducting layer 123 and the conductive enclosure 122 may be alternatively disposed, to effectively ensure the safety regulation requirement of the solid-state transformer 10.

In addition, in addition to being disposed on the outer surface of the insulation base 121, the first conducting layer 123 may be disposed inside the insulation base 121.

Figure 6:
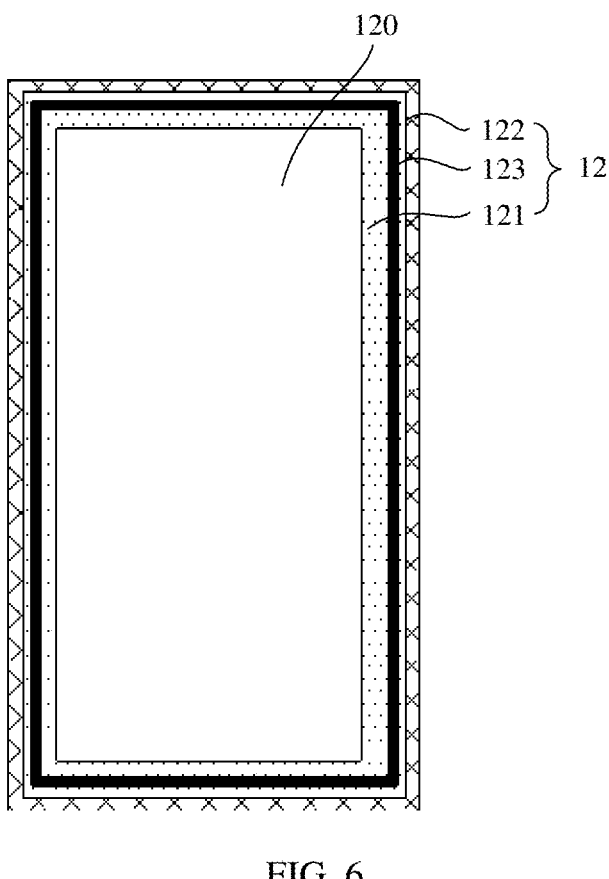
FIG. 6 is a cross sectional schematic view of another housing according to an embodiment.

For example, as shown in FIG. 6, in another embodiment, the first conducting layer 123 may also be disposed in the insulation base 121 in a built manner. A conductor, for example, a metal mesh or a metal sheet, may be built in the insulation base 121. To facilitate implementation of an electrical connection between the first conducting layer 123 and the conductive enclosure 122, an additional conductive member (not shown in the figure) may be further disposed. For example, one end of the conductive member, for example, a screw or a metal wire, may be inserted into the insulation base 121, so that one end of the conductive member is electrically connected to the first conducting layer 123; and the other end of the conductive member may be electrically connected to the conductive enclosure 122 through welding, abutting, or the like, thereby implementing the electrical connection between the first conducting layer 123 and the conductive enclosure 122.

The first conducting layer 123 may be manufactured by using a metal material with good conductivity, for example, copper or aluminum, or may be manufactured by using another material with poor conductivity. A material and a disposing manner of the first conducting layer 123 are not limited.

Figure 7:
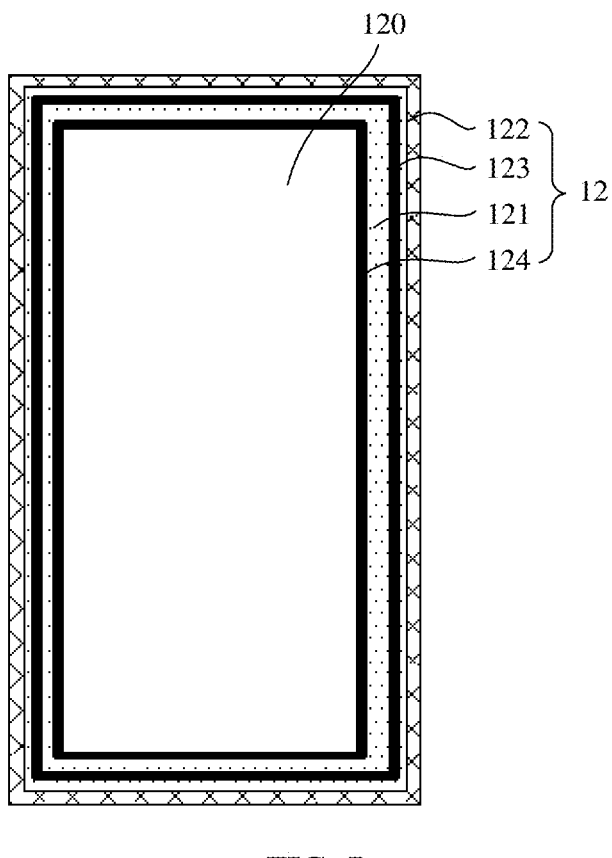
FIG. 7 is a cross sectional schematic view of another housing according to an embodiment.

As shown in FIG. 7, to prevent occurrence of a phenomenon inside the accommodating cavity, for example, an air breakdown, a second conducting layer 124 may also be disposed on an inner wall (a surface of the accommodating cavity 120) of the insulation base 121. A potential point (for example, the midpoint of a negative bus or the midpoint of a positive and negative bus) in the power conversion unit 11 may be electrically connected to the second conducting layer 124.

In an implementation, four second conducting layers 124 may be disposed. That is, each of the power conversion units 11 is electrically connected to the corresponding second conducting layer 124, to prevent occurrence of an undesirable phenomenon, for example, an air breakdown.

A shape and a size of the second conducting layer 124 and a proportion of second conducting layers 124 laid on the inner wall of the insulation base 121 are not limited. In actual application, parameters such as the shape and the size of the second conducting layer 124 may be properly set based on an actual requirement.

The second conducting layer 124 may be manufactured by using a metal material with good conductivity, for example, copper or aluminum, or may be manufactured by using another material with poor conductivity. A material and a disposing manner of the second conducting layer 124 are not limited.

In addition, in addition to being disposed on an inner wall of the accommodating cavity 120, the second conducting layer 124 may be disposed inside the insulation base 121.

Figure 8:
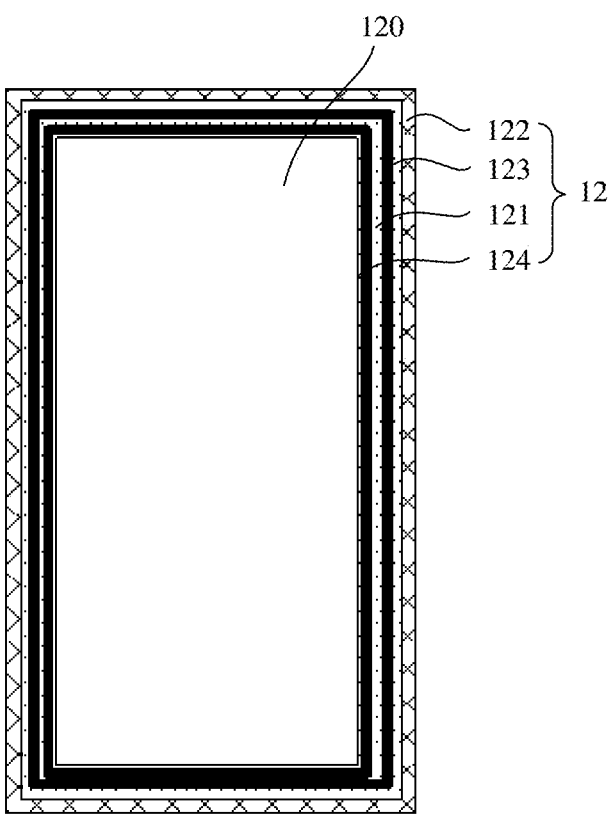
FIG. 8 is a cross sectional schematic view of another housing according to an embodiment.

For example, as shown in FIG. 8, in another embodiment, the second conducting layer 124 may be alternatively disposed in the insulation base 121 in a built manner. A conductor, for example, a metal mesh or a metal sheet, may be built in the insulation base 121. To facilitate implementation of an electrical connection between the second conducting layer 124 and a potential point in the power conversion unit 11, an additional conductive member (not shown in the figure) may be further disposed. For example, one end of the conductive member, for example, a screw or a metal wire, may be inserted into the insulation base 121, so that one end of the conductive member is electrically connected to the second conducting layer 124; and the other end of the conductive member may be electrically connected to a potential point in the power conversion unit 11 through welding, abutting, or the like, thereby implementing the electrical connection between the second conducting layer 124 and a potential point in the power conversion unit 11.

In addition, building the second conducting layer 124 inside the insulation base 121 further facilitates increasing power density of the solid-state transformer 10. Because the inner wall of the accommodating cavity 120 is an insulator, the power conversion unit may abut against the inner wall of the accommodating cavity 120, to reduce a distance between the power conversion unit and the inner wall of the accommodating cavity 120, thereby facilitating increasing space usage of the power conversion unit in the accommodating cavity 120, to increase power density of the solid-state transformer 10.

In addition, in an implementation, locations of the plurality of power conversion units in the accommodating cavity 120 may also be arranged in various manners.

To facilitate understanding of the solid-state transformer 10 provided in this embodiment, an example in which the solid-state transformer 10 includes four power conversion units is used below for description.

Figure 9:
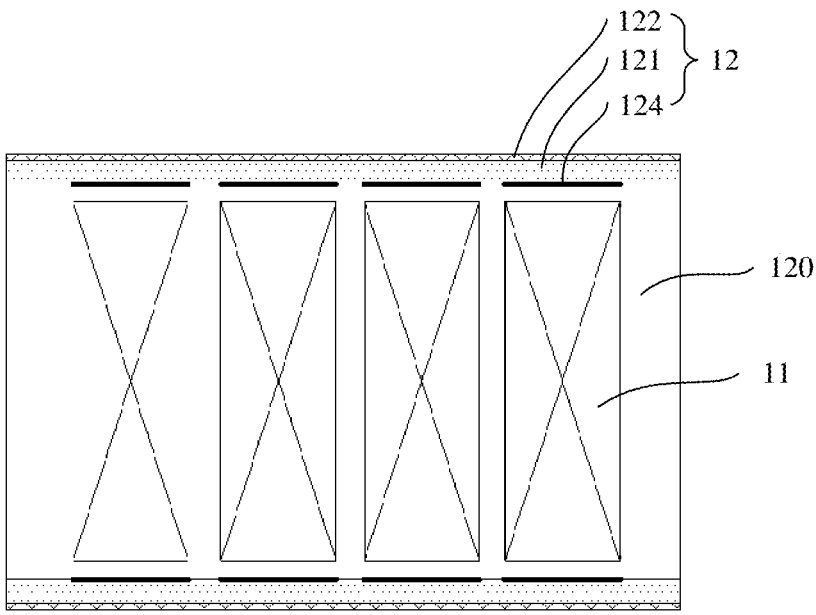
FIG. 9 is a cross sectional schematic view of a solid-state transformer according to an embodiment.

As shown in FIG. 9, in an embodiment, the four power conversion units 11 are arranged horizontally (in a left-right direction in the figure). A distance is maintained between two adjacent power conversion units 11, to ensure a requirement on insulation between the two adjacent power conversion units 11.

Figure 10:
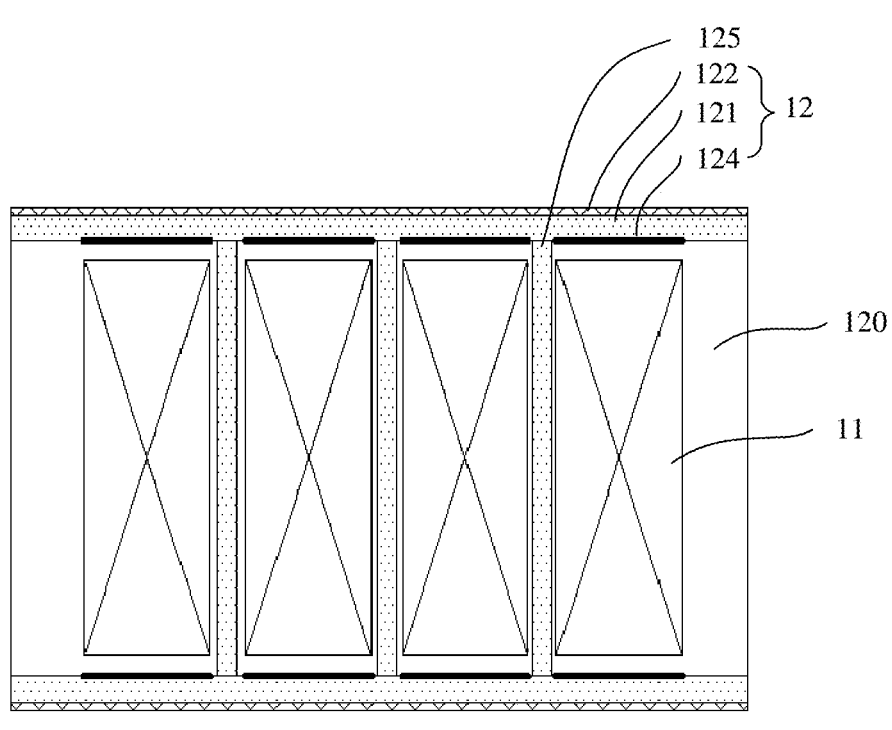
FIG. 10 is a cross sectional schematic view of another solid-state transformer according to an embodiment.

As shown in FIG. 10, in another embodiment, the housing 12 further includes insulation separators 125, and there are three insulation separators 125. That is, one insulation separator 125 is equipped between every two adjacent power conversion units 11. Insulation performance of the insulation separator 125 is superior to insulation performance of air. Therefore, disposing the insulation separator 125 between the two adjacent power conversion units 11 may also effectively reduce the distance between the two adjacent power conversion units 11, to increase power density of the solid-state transformer 10.

In an implementation, the insulation separator 125 and the insulation base 121 may be of an integrated structure. For example, the insulation separator 125 and the insulation base 121 may be manufactured by using a process, for example, injection molding and forming, to form the integrated structure. Alternatively, the insulation separator 125 and the insulation base 121 may also be mechanical parts mutually independent. After the insulation separator 125 and the insulation base 121 are separately manufactured and formed, the insulation separator 125 may be fastened in the accommodating cavity 120 through binding or the like. The insulation separator 125 and the insulation base 121 may be manufactured by using a material with good insulation performance, for example, resin or nylon. In an implementation, materials and processing and forming manners of the insulation separator 125 and the insulation base 121 are not limited.

In addition, when the insulation separator 125 is disposed in the accommodating cavity 120, the second conducting layer 124 may also extend to the insulation separator 125.

Figure 11:
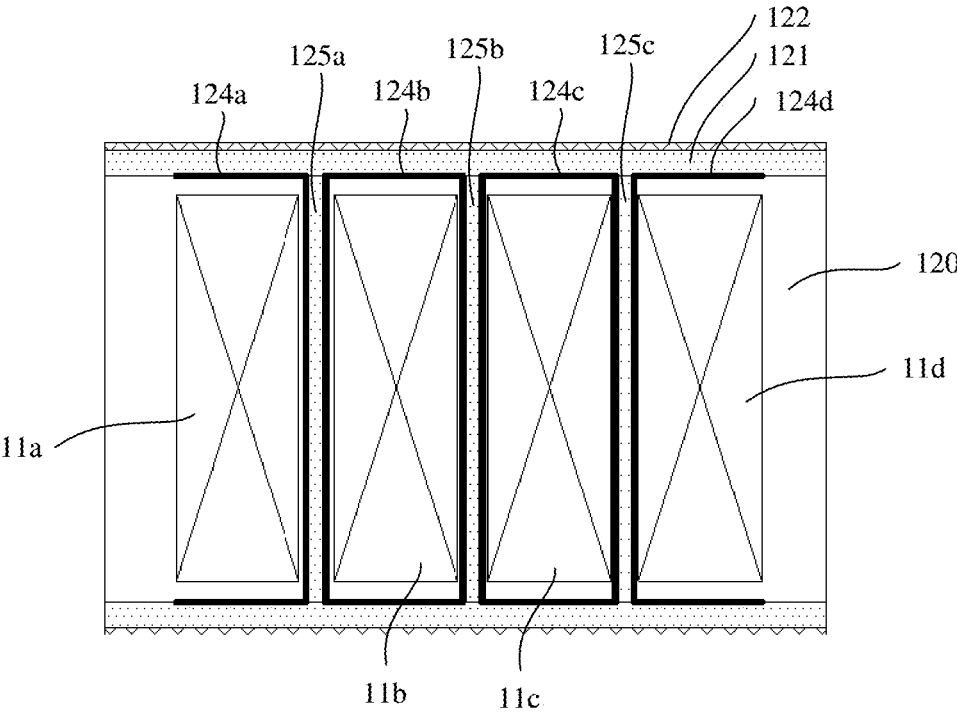
FIG. 11 is a cross sectional schematic view of another solid-state transformer according to an embodiment.

As shown in FIG. 11, in one embodiment, four second conducting layers 124 are disposed, such as a second conducting layer 124*a*, a second conducting layer 124*b*, a second conducting layer 124*c*, and the second conducting layer 124*d*, respectively. The second conducting layer 124*a* is configured to be electrically connected to a potential point in a power conversion unit 11*a*. The second conducting layer 124*b* is configured to be electrically connected to a potential point in a power conversion unit 11*b*. The second conducting layer 124*c* is configured to be electrically connected to a potential point in a power conversion unit 11*c*. The second conducting layer 124*d* is configured to be electrically connected to a potential point in a power conversion unit 11*d*. After an insulation separator 125*a*, an insulation separator 125*b*, and an insulation separator 125*c* are disposed in the accommodating cavity 120, the second conducting layer 124*a* may extend to a left surface of the insulation separator 125*a*, and the second conducting layer 124*b* may extend to a right surface of the insulation separator 125*a* and a left surface of the insulation separator 125*b*. Correspondingly, the second conducting layer 124*c* may extend to a right surface of the insulation separator 125*b* and a left surface of the insulation separator 125*c*. The second conducting layer 124*d* may extend to a right surface of the insulation separator 125*c*. Insulation performance and electromagnetic shielding property between adjacent power conversion units 11 can be effectively improved by using the second conducting layers on the three insulation separators, to prevent the two adjacent power conversion units 11 from affecting each other. In this embodiment, the insulation separator 125 inside the accommodating cavity 120 needs to meet only a requirement on functional insulation between the power conversion units 11, instead of a basic requirement on insulation against the ground. Therefore, used insulation materials can still be reduced, thereby increasing utilization of interior space.

In addition, in an implementation, in addition to being disposed in a horizontal arrangement manner, the plurality of power conversion units 11 may be disposed in a vertical arrangement manner or may be disposed in another manner.

Figure 12:
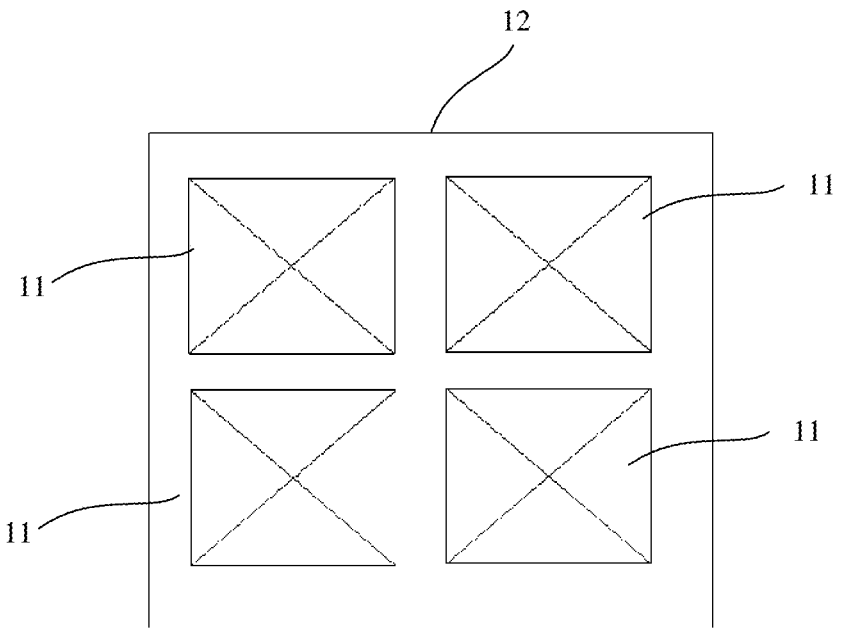
FIG. 12 is a schematic diagram of a distributed structure of a power conversion unit according to an embodiment.

For example, as shown in FIG. 12, in another embodiment, the plurality of power conversion units 11 may be disposed in a matrix array.

Figure 13:
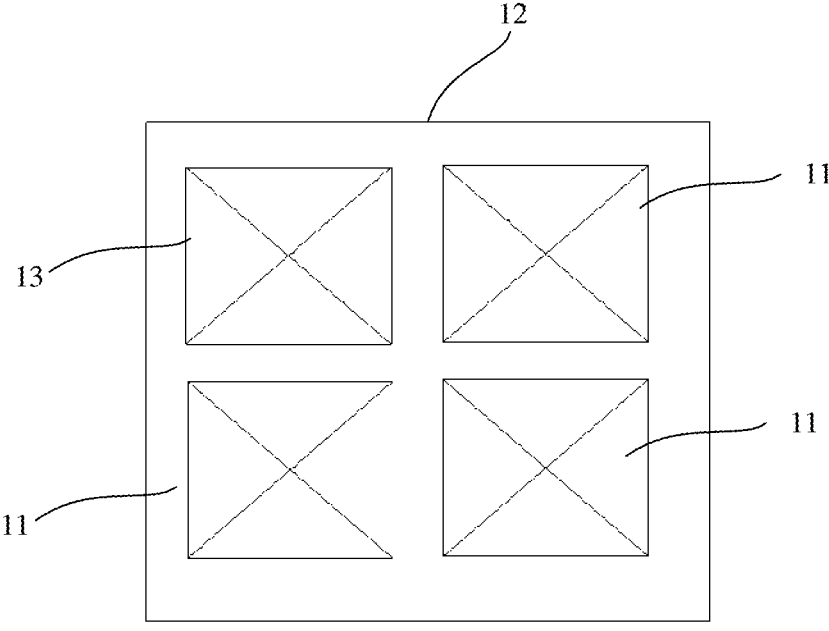
FIG. 13 is a schematic diagram of a distributed structure of a power conversion unit according to an embodiment.

In addition, as shown in FIG. 13, in an application, the solid-state transformer 10 may further include an input circuit unit 13. The power conversion unit 11 may be connected to a power grid by using the input circuit unit 13.

The input circuit unit 13 may include: a filter circuit, a soft-start circuit, a protection circuit, and the like. Electric energy in the power grid may be preliminarily processed by the input circuit unit 13 and may then be transferred to the power conversion unit 11, to ensure quality of the electric energy, thereby enhancing security of the power conversion unit 11 and the like. It can be understood that, in an implementation, types and a quantity of input circuit units 13 are not limited.

In an implementation, all the power conversion units 11 in the solid-state transformer 10 may be connected to the power grid by using one input circuit unit or a plurality of input circuit units.

Figure 14:
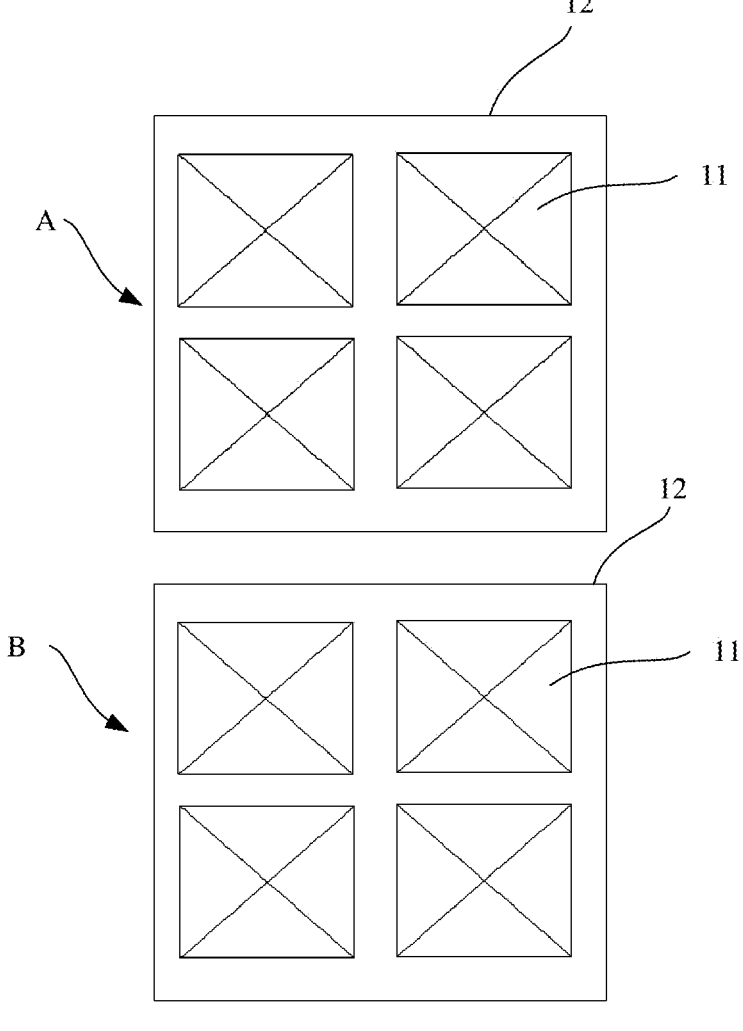
FIG. 14 is a schematic diagram of a distributed structure of a power conversion unit according to an embodiment.

For example, as shown in FIG. 14, in another embodiment, the plurality of power conversion units 11 are arranged in groups, such as a group A and a group B, respectively. In addition, either of the groups is connected to the power grid by using a corresponding input circuit unit 13.

The group A is used as an example. The group A includes the housing 12, three power conversion units 11, and one input circuit unit 13.

In each group, the power conversion unit 11 and the input circuit unit 13 are both accommodated in one housing 12.

It can be understood that, in an implementation, a quantity of groups, a quantity of power conversion units 11 included in each group, and a quantity of input circuit units 13 included in each group are not limited.

It should be noted that, in the foregoing embodiment, an example in which the power conversion unit 11 is entirely disposed in the housing 12 (the accommodating cavity 120) is used for description. In an implementation, part of a structure of the power conversion unit 11 may be located in the housing 12 and the other part of the structure may be located outside the housing 12.

Figure 15:
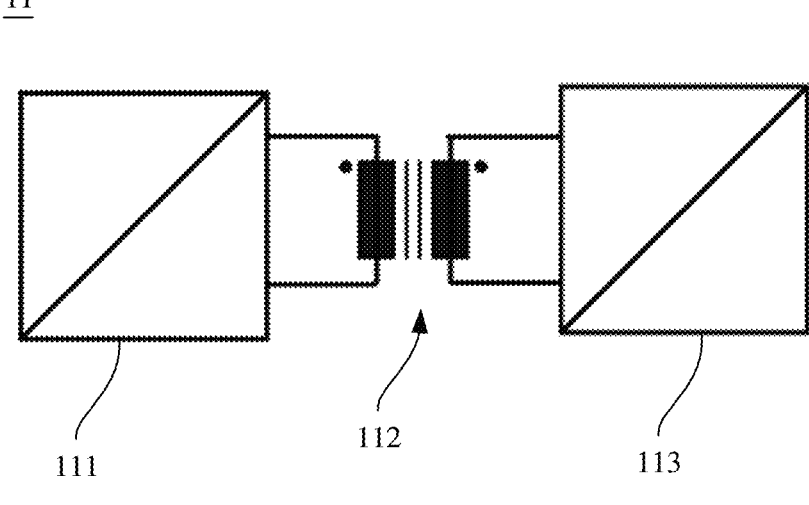
FIG. 15 is a schematic diagram of a structure of a power conversion unit according to an embodiment.

As shown in FIG. 15, the power conversion unit 11 may include a first power conversion circuit 111, a high-frequency transformer 112, and a second power conversion circuit 113, and the first power conversion circuit 111 is coupled to the second power conversion circuit 113 by using the high-frequency transformer 112.

Figure 16:
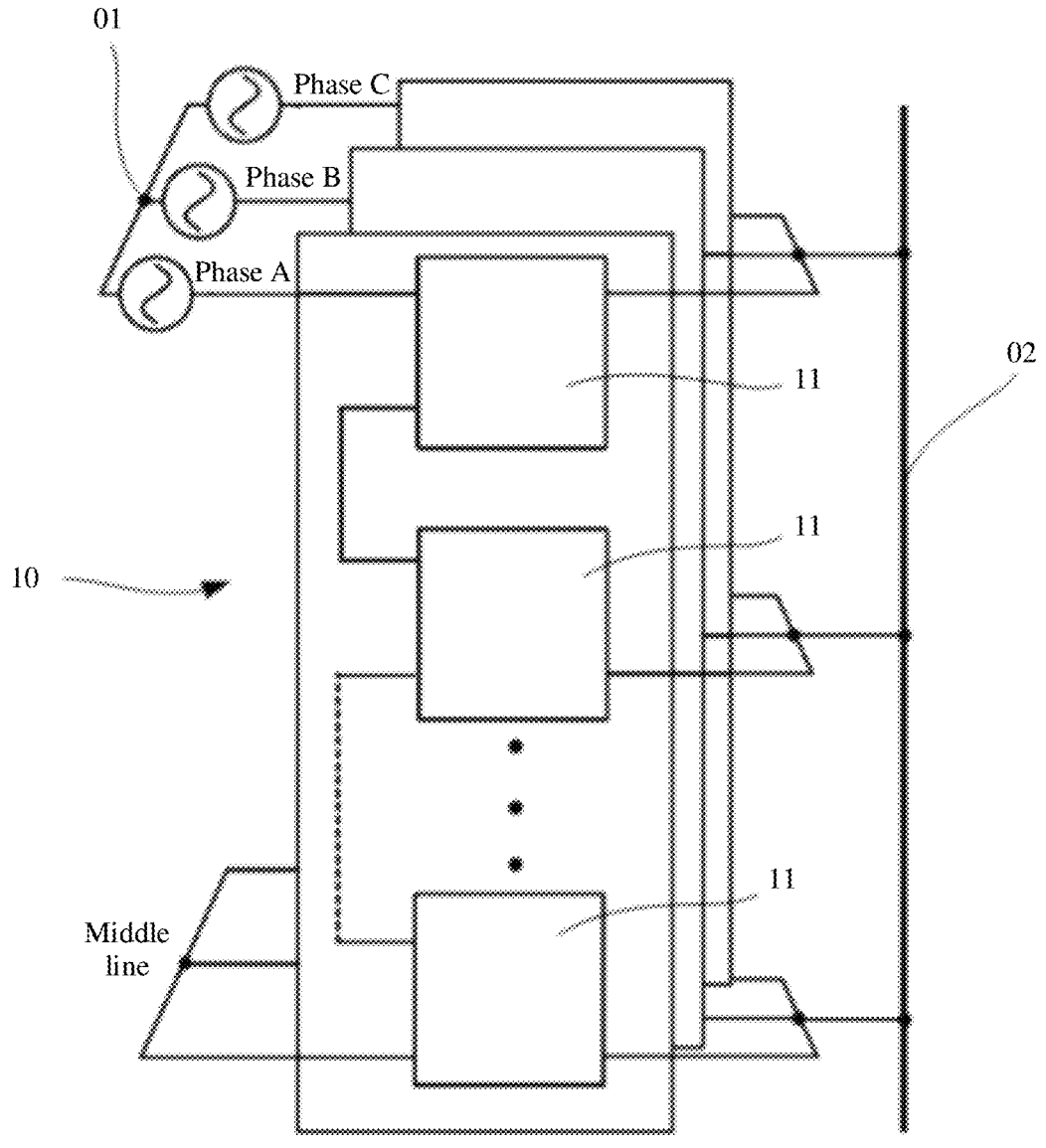
FIG. 16 is a schematic diagram of an application scenario of a solid-state transformer according to an embodiment, where

As shown in FIG. 16, in actual application, the first power conversion circuit 111 may be connected to a power grid 01. The second power conversion circuit 113 may be connected to a load terminal 02. Because a voltage of the power grid 01 may be greater than a voltage of the load terminal 02, an insulation voltage to ground of the first power conversion circuit 111 may be greater than an insulation voltage to ground of the second power conversion circuit 113.

In some cases, the first power conversion circuit 111 may be insulated with a high specification, and the second power conversion circuit 113 may be insulated with a low specification. Therefore, the first power conversion circuit 111 may be disposed in the housing, and the second power conversion circuit 113 may be disposed outside the housing, to reduce the volume of the housing, thereby helping increase power density of the solid-state transformer 10.

In an implementation, at least first power conversion circuits 111 in the plurality of power conversion units 11 may be disposed in the housing, to meet the insulation requirement and the safety regulation requirement of the solid-state transformer 10.

It can be understood that, in actual application, a quantity of first power conversion circuits 111, a quantity of high-frequency transformers 112, and a quantity of second power conversion circuits 113 included in each of the power conversion units 11 may vary.

For example, in a single power conversion unit 11, a topology may be a single-power module. Only one first power conversion circuit 111, one high-frequency transformer 112, and one second power conversion circuit 113 may be included.

A single power conversion unit 11 may alternatively include more than one first power conversion circuit 111, more than one high-frequency transformer 112, and more than one second power conversion circuit 113. For example, in a single power conversion unit 11, a topology may alternatively be multi-level or multi-power modules connected in series, in parallel, or the like. In other words, a type of the power conversion unit 11 is not limited.

In an implementation, the plurality of power conversion units 11 may also be connected in various manners.

For example, as shown in FIG. 16, in one embodiment, on a side of the power grid 01, the plurality of power conversion units 11 may be connected to the power grid 01 in series. On a load side, the plurality of power conversion units 11 may be connected to the load terminal 02 in parallel. That is, the plurality of power conversion units 11 are connected in series on an input side and in parallel on an output side.

The solid-state transformer 10 may be applied to not only a three-phase alternating current power grid, but also a single-phase power grid, a multi-phase power grid, or a load. An application scenario of the solid-state transformer 10 is not limited.

In addition to being a load device, for example, a server or a memory, the load terminal may be photovoltaic power generating equipment (in this case, a low-voltage side is connected to a power generating source). For example, a medium-voltage side (for example, the first power conversion circuit 111) of the solid-state transformer 10 may be connected to the power grid, and a low-voltage side (for example, the second power conversion circuit 113) may be connected to the photovoltaic power generating equipment. Electric energy generated by the photovoltaic power generating equipment may be processed, for example, stepped up, by the solid-state transformer 10, and then processed electric energy is merged into the power grid for use by another electric device in the power grid.

Alternatively, the solid-state transformer 10 may also be integrated in a power supply device.

For example, the power supply device may be a charging pile of a new energy vehicle, or the like. The power supply device may include a cabinet, and the solid-state transformer 10 may be installed in the cabinet. The conductive enclosure 122 of the solid-state transformer 10 may be connected to the cabinet, so that the conductive enclosure is grounded. Alternatively, the conductive enclosure 122 may be directly grounded.

Alternatively, the solid-state transformer 10 may be integrated on the load terminal.

For example, an embodiment may further provide a data center, including a plurality of load devices and the solid-state transformer 10. The data center may include an equipment room and the load devices such as a server and a memory that are located in the equipment room. The load device may be connected to a power grid by using the solid-state transformer 10, to receive electric energy in the power grid 01.

The foregoing descriptions are merely implementations, but are not intended as limiting. Any variation or replacement readily figured out by a person skilled in the art shall fall within the scope of the embodiments.

What is claimed is:

1. A solid-state transformer, comprising:
M power conversion units, wherein each power conversion unit of the M power conversion units comprises a first power conversion circuit, a high-frequency transformer, and a second power conversion circuit, and the first power conversion circuit is coupled to the second power conversion circuit by using the high-frequency transformer; and
a housing having an insulation base and a conductive enclosure, wherein the conductive enclosure is sleeved on to at least partially surround an outer surface of the insulation base,
wherein
the insulation base has an accommodating cavity, and M first power conversion circuits of the M power conversion units are disposed in the accommodating cavity at intervals,
wherein an inner wall of the conductive enclosure is configured to hermetically fit an outer surface of the insulation base via a sealing structure disposed between the inner wall and the outer surface, and
wherein
M is an integer greater than 1.

2. The solid-state transformer according to claim 1, wherein the insulation base has a first conducting layer that is electrically connected to the conductive enclosure.

3. The solid-state transformer according to claim 2, wherein the first conducting layer is located on the outer surface of the insulation base or built inside the insulation base.

4. The solid-state transformer according to claim 1, wherein an inner wall of the accommodating cavity has M second conducting layers, and a potential point of each of the M first power conversion circuit is electrically connected to a second conducting layer corresponding to the potential point of the first power conversion circuit.

5. The solid-state transformer according to claim 4, wherein the second conducting layer is located on the outer surface of the insulation base or built inside the insulation base.

6. The solid-state transformer according to claim 1, wherein an insulation separator is provided in the accommodating cavity, and the insulation separator is configured to isolate the M first power conversion circuits.

7. The solid-state transformer according to claim 6, wherein when the inner wall of the accommodating cavity has the second conducting layer, the second conducting layer extends to the insulation separator.

8. The solid-state transformer according to claim 1, further comprising:

an input circuit unit electrically connected to the first power conversion circuit; and the input circuit unit is located in the accommodating cavity and is disposed at an interval from the first power conversion unit.

9. The solid-state transformer according to claim 8, wherein the input circuit unit comprises at least one of a filter circuit, a soft-start circuit, or a protection circuit.

10. The solid-state transformer according to claim 1, M second power conversion circuits of the M power conversion units are disposed in the accommodating cavity at intervals.

11. The solid-state transformer according to claim 1, the M power conversion units are disposed in the accommodating cavity at intervals.

12. A power supply device, comprising a cabinet and a solid-state transformer, and the solid-state transformer comprises:

M power conversion units, wherein each power conversion unit of the M power conversion units comprises a first power conversion circuit, a high-frequency transformer, and a second power conversion circuit, and the first power conversion circuit is coupled to the second power conversion circuit by using the high-frequency transformer; and a housing, having an insulation base and a conductive enclosure, wherein the conductive enclosure is sleeved on to at least partially surround an outer surface of the insulation base, wherein the insulation base has an accommodating cavity, and M first power conversion circuits of the M power conversion units are disposed in the accommodating cavity at intervals, wherein an inner wall of the conductive enclosure is configured to hermetically fit an outer surface of the insulation base via a sealing structure disposed between the inner wall and the outer surface, wherein M is an integer greater than 1;

and wherein the solid-state transformer is disposed in the cabinet, and the conductive enclosure is grounded by using the cabinet.

13. The power supply device according to claim 12, wherein the insulation base has a first conducting layer that is electrically connected to the conductive enclosure.

14. The power supply device according to claim 13, wherein the first conducting layer is located on the outer surface of the insulation base or built inside the insulation base.

15. A data center, comprising a load device and further comprising a power supply device, wherein the power supply device, comprising a cabinet and a solid-state transformer, and the solid-state transformer comprises:

M power conversion units, wherein each power conversion unit of the M power conversion units comprises a first power conversion circuit, a high-frequency transformer, and a second power conversion circuit, and the first power conversion circuit is coupled to the second power conversion circuit by using the high-frequency transformer; and a housing, having an insulation base and a conductive enclosure, wherein the conductive enclosure is sleeved on to at least partially surround an outer surface of the insulation base, wherein the insulation base has an accommodating cavity, and M first power conversion circuits of the M power conversion units are disposed in the accommodating cavity at intervals, wherein an inner wall of the conductive enclosure is configured to hermetically fit an outer surface of the insulation base via a sealing structure disposed between the inner wall and the outer surface, wherein M is an integer greater than 1;

and wherein the solid-state transformer is disposed in the cabinet, and the conductive enclosure is grounded by using the cabinet, and wherein a first power conversion circuit is configured to connect to a power supply grid, and a second power conversion circuit is configured to connect to the load device.

16. The data center according to claim 15, wherein the insulation base has a first conducting layer that is electrically connected to the conductive enclosure.

17. The data center according to claim 16, wherein the first conducting layer is located on the outer surface of the insulation base or built inside the insulation base.

* * * * *